(12) United States Patent
Chen et al.

(10) Patent No.: US 11,032,827 B2
(45) Date of Patent: Jun. 8, 2021

(54) ROUTE SELECTION METHOD AND APPARATUS

(71) Applicant: Huawei Technologies Co., Ltd., Shenzhen (CN)

(72) Inventors: Qiulin Chen, Shanghai (CN); Lei Tong, Hangzhou (CN); Guohuai Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/591,282

(22) Filed: Oct. 2, 2019

(65) Prior Publication Data

US 2020/0037333 A1 Jan. 30, 2020

Related U.S. Application Data

(63) Continuation of application No. 15/800,434, filed on Nov. 1, 2017, now Pat. No. 10,470,195, which is a (Continued)

(30) Foreign Application Priority Data

Nov. 30, 2015 (CN) .......................... 201510859437.5

(51) Int. Cl.
*H04W 72/08* (2009.01)
*H04W 40/10* (2009.01)
(Continued)

(52) U.S. Cl.
CPC ......... *H04W 72/085* (2013.01); *H04L 45/123* (2013.01); *H04W 40/10* (2013.01);
(Continued)

(58) Field of Classification Search
CPC .. H04L 45/123; H04W 40/10; H04W 40/246; H04W 40/30; H04W 72/0473;
(Continued)

(56) References Cited

U.S. PATENT DOCUMENTS

| 10,470,195 | B2 * | 11/2019 | Chen | H04L 45/123 |
| 2003/0045295 | A1 * | 3/2003 | Stanforth | H04W 88/16 455/445 |

(Continued)

FOREIGN PATENT DOCUMENTS

| CN | 201004643 Y | 1/2008 |
| CN | 101299707 A | 11/2008 |

(Continued)

OTHER PUBLICATIONS

Machine Translation and Abstract of Chinese Publication No. CN101299707, Nov. 5, 2008, 13 pages.

(Continued)

*Primary Examiner* — Kashif Siddiqui
(74) *Attorney, Agent, or Firm* — Conley Rose, P.C.

(57) ABSTRACT

A route selection method and apparatus includes a first mesh node for selecting a route obtains energy consumption information of at least two second mesh nodes, where the second mesh node provides a route for the first mesh node; and the first mesh node selects a route according to the energy consumption information of the at least two second mesh nodes.

20 Claims, 4 Drawing Sheets

Related U.S. Application Data continuation of application No. PCT/CN2016/086032, filed on Jun. 16, 2016.

(51) Int. Cl.
*H04L 12/721* (2013.01)
*H04W 40/30* (2009.01)
*H04W 40/24* (2009.01)
*H04W 72/04* (2009.01)
*H04W 84/18* (2009.01)

(52) U.S. Cl.
CPC ......... *H04W 40/246* (2013.01); *H04W 40/30* (2013.01); *H04W 72/0473* (2013.01); *H04W 84/18* (2013.01); *Y02D 30/70* (2020.08)

(58) Field of Classification Search
CPC .. H04W 72/085; H04W 84/18; Y02D 70/142; Y02D 70/20; Y02D 70/22; Y02D 70/326; Y02D 30/70
See application file for complete search history.

(56) References Cited

U.S. PATENT DOCUMENTS

| | | |
|---|---|---|
| 2005/0195810 A1 | 9/2005 | Sung et al. |
| 2006/0253735 A1 | 11/2006 | Kwak et al. |
| 2007/0204021 A1 | 8/2007 | Ekl et al. |
| 2009/0010189 A1* | 1/2009 | Nagra .................. H04W 40/10 370/311 |
| 2011/0194472 A1 | 8/2011 | Bahr |
| 2013/0064127 A1 | 3/2013 | Wang et al. |
| 2014/0036683 A1 | 2/2014 | Krishnamurthy et al. |

FOREIGN PATENT DOCUMENTS

| | | |
|---|---|---|
| CN | 101790196 A | 7/2010 |
| CN | 102149138 A | 8/2011 |
| CN | 102263688 A | 11/2011 |
| CN | 102857989 A | 1/2013 |
| CN | 104509168 A | 4/2015 |
| CN | 105515994 A | 4/2016 |
| EP | 2592870 A1 | 5/2013 |
| JP | 2008533848 A | 8/2008 |

OTHER PUBLICATIONS

Machine Translation and Abstract of Chinese Publication No. CN101790196, Jul. 28, 2010, 22 pages.
Machine Translation and Abstract of Chinese Publication No. CN102149138, Aug. 10, 2011, 13 pages.
Machine Translation and Abstract of Chinese Publication No. CN105515994, Apr. 20, 2016, 25 pages.
Machine Translation and Abstract of Chinese Publication No. CN102857989, Jan. 2, 2013, 11 pages.
Chen, W., et al., "The Research of Ultro-low Power Routing Algorithm based on WMN," Engineering Master's Dissertation of Zhengzhou University, Mar. 2014, 57 pages.
Kim, D., et al., "Traffic Load and Lifetime Deviation Based Power-Aware Routing Protocol for Wireless Ad Hoc Networks," XP019031642, Jan. 1, 2006, 12 pages.
Ortiz, A., et al., "Adaptive Routing for Multihop IEEE 802.15.6 Wireless Body Area Networks," XP032470594, Sep. 11, 2012, 24 pages.
Foreign Communication From a Counterpart Application, PCT Application No. PCT/CN2016/086032, English Translation of International Search Report dated Sep. 1, 2016, 2 pages.
Foreign Communication From a Counterpart Application, Chinese Application No. 201510859437.5, Chinese Office Action dated Jan. 25, 2018, 6 pages.
Foreign Communication From a Counterpart Application, European Application No. 16869594.8, Extended European Search Report dated Apr. 30, 2018, 11 pages.

\* cited by examiner

ROUTE SELECTION METHOD AND APPARATUS

CROSS-REFERENCE TO RELATED APPLICATIONS

This application is a continuation application of application Ser. No. 15/800,434, filed on Nov. 1, 2017, which is a continuation application of International Application No. PCT/CN2016/086032, filed on Jun. 16, 2016, which claims priority to Chinese Patent Application No. 201510859437.5, filed on Nov. 30, 2015. The disclosures of the aforementioned applications are hereby incorporated herein by reference in their entireties.

TECHNICAL FIELD

The present disclosure relates to the field of network technologies, and in particular, to a route selection method and apparatus.

BACKGROUND

A mesh network has advantages of a wide coverage area, low deployment costs, easy access, and the like, and therefore has an extremely broad application prospect. For example, a mesh network technology is commonly used in the Internet of Things.

Each mesh node that is to select a route in the mesh network selects a route based on signal strength of a mesh node that can provide a route. For example, a client generally accesses an access point (AP) with a relatively strong signal. However, each mesh node in the mesh network selects a route based on signal strength, which may cause an energy use imbalance in the mesh network, and reduce an available time of the mesh network. For example, currently there are four clients and two APs. The four clients are respectively c1, c2, c3, and c4, and the two APs are respectively AP 1 and AP 2. For the c1 and the c2, signal strength of the AP 1 is greater than that of the AP 2, and for the c3 and the c4, signal strength of the AP 1 is approximately the same as that of the AP 2, but the signal strength of the AP 1 is slightly greater than that of the AP 2. Therefore, if a solution of selecting a route based on signal strength is used, the c1, the c2, the c3, and the c4 access the AP 1, load of the AP 1 is significantly greater than that of the AP 2, and energy consumption of the AP 1 is accelerated, while the AP 2 consumes no energy. This causes an energy consumption imbalance. When the AP 1 runs out of energy, the c1 and the c2 need to access the AP 2 that is at a farther distance, which consumes more energy than accessing the AP 1. Therefore, overall power consumption of the mesh network is increased, and the available time of the mesh network is reduced.

SUMMARY

Embodiments of the present disclosure provide a route selection method and apparatus, so as to prolong an available time of a mesh network.

According to a first aspect, a route selection method is provided, where a first mesh node that is to select a route obtains energy consumption information of a second mesh node that can provide a route for the first mesh node. This embodiment of the present disclosure is mainly for a case in which there is more than one second mesh node that provides a route for the first mesh node. Therefore, the first mesh node needs to obtain energy consumption information of at least two second mesh nodes, so as to select a route. The first mesh node obtains the energy consumption information of the second mesh nodes, and then may select a route according to the energy consumption information of the at least two second mesh nodes. According to the present disclosure, energy consumption information of a mesh node that can provide a route may be comprehensively considered when a route is selected, and the mesh node can maintain data exchange for as a longer time as possible, so that an available time of a mesh network can be prolonged.

In this embodiment of the present disclosure, the first mesh node and the second mesh node may be mesh nodes of any type, that is, any one of a client, an AP, a mesh point (MP), a mesh access point (MAP), or a mesh point portal (MPP).

In this embodiment of the present disclosure, to enable the mesh node to select a route with reference to the energy consumption information, in a possible design, each mesh node in the mesh network may transmit energy consumption information of the mesh node by using a data exchange process, and certainly may also transmit energy consumption information of another mesh node. Therefore, in this embodiment of the present disclosure, the first mesh node may obtain the energy consumption information of the at least two second mesh nodes in at least one of the following manners, including obtaining, by the first mesh node, the energy consumption information of the second mesh node by using the second mesh node; or obtaining, by the first mesh node, the energy consumption information of the second mesh node by using a third mesh node, where the third mesh node is a mesh node that is in the mesh network and that can obtain the energy consumption information of the second mesh node. In another possible design, in this embodiment of the present disclosure, each mesh node with a data exchange process may actively transmit obtained energy consumption information of another mesh node at a specific time frequency, such as once a day, so as to actively trigger transmission of the energy consumption information, and accelerate transmission of the energy consumption information. Optionally, in this embodiment of the present disclosure, a mesh node that is in the mesh network and that is associated with more other mesh nodes may be preferentially selected to actively transmit the obtained energy consumption information of the another mesh node, so that the energy consumption information is transmitted more quickly and in a larger scale. In other words, in this embodiment of the present disclosure, a mesh node that is in the mesh network and that is associated with at least two mesh nodes may be used to transmit the energy consumption information, for example, a mesh node that is associated with most mesh nodes may be selected to transmit the energy consumption information, that is, the third mesh node may be the mesh node that is in the mesh network and that is associated with at least two mesh nodes.

Optionally, in this embodiment of the present disclosure, the first mesh node may obtain energy consumption information that is of a fourth mesh node and that is transmitted by the second mesh node, where the fourth mesh node is a mesh node that is different from the second mesh node, and forward the energy consumption information of the second mesh node and the energy consumption information of the fourth mesh node to another mesh node that is different from the first mesh node.

With reference to the first aspect, in a possible implementation manner, the energy consumption information of the second mesh node includes a power supply manner for the second mesh node and a time that can be maintained by remaining power of the second mesh node; and the selecting, by the first mesh node, a route according to the energy consumption information of the at least two second mesh nodes includes determining, by the first mesh node, a power supply manner for each of the second mesh nodes; and if the power supply manners for the at least two second mesh nodes are different, selecting a route in a sequence that a priority of non-battery power supply is higher than a priority of battery power supply, so as to prolong the available time of the mesh network; or if the power supply manners for the at least two second mesh nodes are the same, selecting a route according to a time that can be maintained by remaining power and signal strength of the at least two second mesh nodes, so as to balance energy consumption of mesh nodes in the mesh network.

Optionally, the selecting a route according to a time that can be maintained by remaining power and signal strength of the at least two second mesh nodes includes determining a signal strength range of signal strength of each of the second mesh nodes; selecting, according to the determined signal strength range, a preset manner for determining a comprehensive and preferred index, and determining a comprehensive and preferred index of each of the second mesh nodes according to the determined manner for determining a comprehensive and preferred index, where the comprehensive and preferred index is a value obtained after a mathematical operation is performed, according to different weight ratios, on the time that can be maintained by the remaining power and the signal strength, and the comprehensive and preferred index is determined in different manners in different signal strength ranges; and sorting the comprehensive and preferred indexes, and selecting a route in descending order of the comprehensive and preferred indexes.

In this embodiment of the present disclosure, to enable a service capability provided by the mesh node to last for a longer time, the mesh node may disable a data forwarding function according to a length of a time that can be maintained by remaining power of the mesh node, and send a data forwarding function disabling notification message to another mesh node, so that a mesh node that is associated with the mesh node tries to associate another mesh node.

Further, in this embodiment of the present disclosure, when the remaining power of the mesh node that sends the data forwarding function disabling notification message recovers, for example, a battery is replaced manually, or the remaining power is higher than a preset threshold, the mesh node may re-enable the data forwarding function, and send a data forwarding function enabling notification message, so that a mesh node that needs to select a route in the network selects a more appropriate mesh node as a route node.

Therefore, with reference to the first aspect, in another possible implementation manner, the first mesh node receives a data forwarding function disabling notification message sent by a selected second mesh node, and a data forwarding function enabling notification message sent by an unselected second mesh node.

According to a second aspect, a route selection apparatus is provided, including an obtaining unit and a routing unit, where the obtaining unit is configured to obtain energy consumption information of at least two mesh nodes, and the routing unit is configured to select a route according to the energy consumption information of the at least two mesh nodes.

According to the present disclosure, energy consumption information of a mesh node that can provide a route may be comprehensively considered when a route is selected, and the mesh node can maintain data exchange for as a longer time as possible, so that an available time of a mesh network can be prolonged.

Specifically, the obtaining unit obtains the energy consumption information of the at least two mesh nodes in at least one of the following manners, including obtaining the energy consumption information of the mesh node by using the mesh node; or obtaining the energy consumption information of the mesh node by using another mesh node that can obtain the energy consumption information of the mesh node.

Optionally, another mesh node is a mesh node that is in the mesh network and that is associated with at least two mesh nodes.

Optionally, the obtaining unit is further configured to obtain other energy consumption information that is transmitted by the mesh node and that is different from the energy consumption information of the mesh node.

The apparatus further includes a sending unit, where the sending unit is configured to forward the energy consumption information of the mesh node and the energy consumption information of another mesh node, so that the energy consumption information of the mesh nodes is transmitted in a larger scale, and each mesh node in the mesh network may obtain energy consumption information of another mesh node.

In this embodiment of the present disclosure, the energy consumption information includes a power supply manner for the mesh node and a time that can be maintained by remaining power of the mesh node.

The routing unit is specifically configured to select a route according to the energy consumption information of the at least two mesh nodes in the following manner, including determining a power supply manner for each of the mesh nodes; and if the power supply manners for the at least two mesh nodes are different, selecting a route in a sequence that a priority of non-battery power supply is higher than a priority of battery power supply; or if the power supply manners for the at least two mesh nodes are the same, selecting a route according to a time that can be maintained by remaining power and signal strength of the at least two mesh nodes.

Specifically, the routing unit is specifically configured to select a route according to the time that can be maintained by remaining power and the signal strength of the at least two mesh nodes in the following manner, including determining a signal strength range of signal strength of each of the mesh nodes; selecting, according to the determined signal strength range, a preset manner for determining a comprehensive and preferred index, and determining a comprehensive and preferred index of each of the mesh nodes according to the determined manner for determining a comprehensive and preferred index, where the comprehensive and preferred index is a value obtained after a mathematical operation is performed, according to different weight ratios, on the time that can be maintained by the remaining power and the signal strength, and the comprehensive and preferred index is determined in different manners in different signal strength ranges; and sorting the comprehensive and preferred indexes, and selecting a route in descending order of the comprehensive and preferred indexes.

Optionally, the obtaining unit is further configured to receive a data forwarding function disabling notification message sent by the mesh node, so that the mesh node can maintain data exchange for a longer time, to prolong an available time of the mesh network.

According to a third aspect, a route selection apparatus is provided, where the route selection apparatus includes a memory and a processor, the memory stores a computer-readable program, and the processor performs, by running the program in the memory, the route selection method involved in the first aspect of the embodiments of the present disclosure.

According to a fourth aspect, a computer storage medium is provided and is configured to store a computer software instruction used by the foregoing route selection apparatus, where the computer software instruction includes an involved program that is used to perform the foregoing route selection method involved in the first aspect.

DESCRIPTION OF EMBODIMENTS

The following clearly describes the technical solutions in the embodiments of the present disclosure with reference to the accompanying drawings in the embodiments of the present disclosure.

Figure 1:
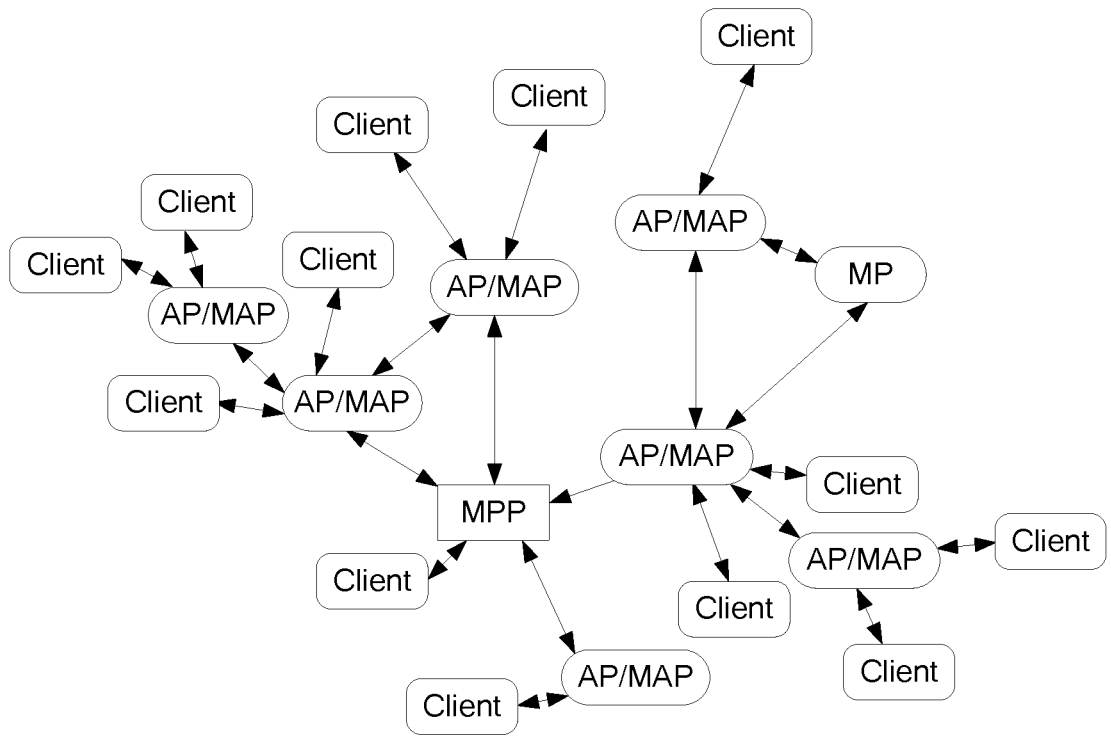
FIG. 1 is a mesh network system architecture used in a route selection method according to an embodiment of the present disclosure.

A route selection method provided in the embodiments of the present disclosure may be used in a mesh network shown in FIG. 1. In the mesh network shown in FIG. 1, data may be exchanged between mesh nodes such as a client, an AP, a MP, a MAP and a MPP, and each mesh node may select a different route to exchange data. Selecting a route refers to accessing a mesh node and exchanging data by using the accessed mesh node. Energy consumption information of mesh nodes is different, and energy consumption information in the embodiments of the present disclosure mainly refers to a power supply manner for a mesh node and a time that can be maintained by remaining power. Therefore, if the mesh node selects different routes, overall power consumption of the mesh network may be different, and an available time for providing a mesh service by the entire mesh network is also different.

The embodiments of the present disclosure provide a route selection method that is based on energy consumption information of a mesh node, so as to prolong an available time of a mesh network.

The route selection method provided in the embodiments of the present disclosure may be performed by any mesh node that needs to select a route in the mesh network. For ease of description, in the following, a mesh node that needs to select a route is referred to as a first mesh node, and a mesh node that can provide a route for the first mesh node is referred to as a second mesh node.

It should be noted that the first mesh node and the second mesh node in the embodiments of the present disclosure may be mesh nodes of any type, that is, any one of a client, an AP, an MP, an MAP, or an MPP.

Figure 2:
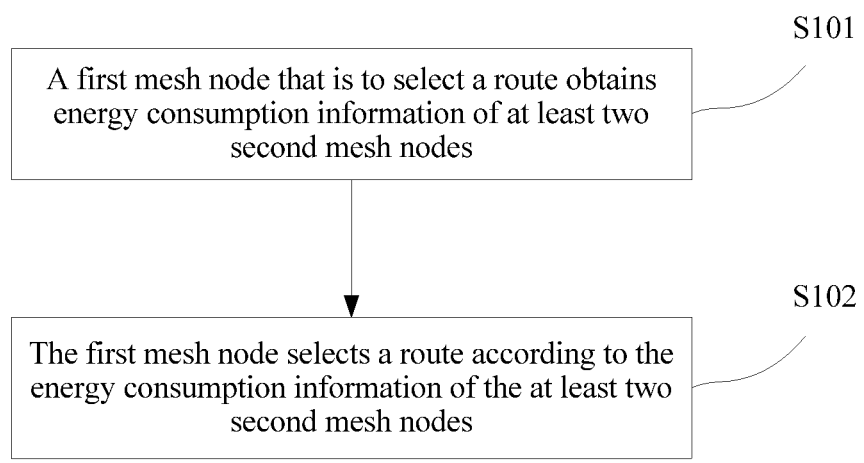
FIG. 2 is a flowchart of implementation of a route selection method according to an embodiment of the present disclosure.

FIG. 2 is a flowchart of implementation of a route selection method according to an embodiment of the present disclosure. As shown in FIG. 2, the method includes the following steps.

Step S101. A first mesh node that is to select a route obtains energy consumption information of at least two second mesh nodes.

Specifically, if there is one second mesh node that provides a route for the first mesh node, the first mesh node selects the only second mesh node to exchange data. This embodiment of the present disclosure is mainly for a case in which there is more than one second mesh node that provides a route for the first mesh node.

It may be understood that the energy consumption information of the second mesh node mainly refers to a power supply manner for the second mesh node and a time that can be maintained by remaining power. The power supply manner mainly refers to whether power is supplied by a battery, and the time that can be maintained by the remaining power mainly refers to a time of normal data exchange that can be maintained by the remaining power of the second mesh node.

Step S102. The first mesh node selects a route according to the energy consumption information of the at least two second mesh nodes.

Specifically, in this embodiment of the present disclosure, when selecting a route, the first mesh node may preferentially select, from the obtained at least two second mesh nodes, a mesh node whose power is not supplied by a battery and whose remaining power can maintain a relatively long time, to exchange data, so that a time of data exchange that can be maintained by the second mesh node can be prolonged, and further, an available time of a mesh network can be prolonged.

In this embodiment of the present disclosure, the following describes a specific implementation process of the foregoing steps in detail.

First, how the first mesh node obtains the energy consumption information of the second mesh node is described.

In this embodiment of the present disclosure, data is exchanged between mesh nodes. Therefore, respective energy consumption information may be transmitted by using a data exchange process. In this embodiment of the present disclosure, the respective energy consumption information is transmitted between the mesh nodes by using the data exchange process, so that each mesh node obtains energy consumption information of a mesh node that exchanges data with the mesh node. If when transmitting the energy consumption information, the mesh node not only transmits the energy consumption information of the mesh node, but also transmits obtained energy consumption information of another mesh node, some mesh nodes in the mesh network can obtain energy consumption information of other mesh nodes than mesh nodes that exchange data with the some mesh nodes.

Therefore, in this embodiment of the present disclosure, the first mesh node may obtain the energy consumption information of the second mesh node by using the second mesh node, or may obtain the energy consumption information of the second mesh node by using a third mesh node, where the third mesh node is a mesh node that is in the mesh network and that can obtain the energy consumption information of the second mesh node.

It may be understood that, in this embodiment of the present disclosure, in a process of obtaining the energy consumption information of the second mesh node, the first mesh node may further obtain energy consumption information of another mesh node than the second mesh node. For ease of description in this embodiment of the present disclosure, another mesh node is referred to as a fourth mesh node. To accelerate transmission of energy consumption information, the first mesh node may forward the energy consumption information of the second mesh node and the energy consumption information of the fourth mesh node to another mesh node that is different from the first mesh node.

In this embodiment of the present disclosure, to avoid repeated transmission of information and avoid a network storm, a unique identifier may be allocated to a message that is sent by each mesh node and that is used to transmit energy consumption information. The unique identifier is used to distinguish whether the message has been transmitted, and if the message has been transmitted, transmission is not repeated.

In this embodiment of the present disclosure, to transmit the energy consumption information in a larger scale, and enable each mesh node in the mesh network to select a route with reference to the energy consumption information, the energy consumption information may further be transmitted in the following several optional manners.

It may be understood that, in a specific implementation process, one of the following methods may be selected, or multiple methods may be selected and used simultaneously. A purpose is to enable each mesh node in the mesh network to know energy consumption information of another mesh node, so that each mesh node can select a route with reference to the energy consumption information.

Type 1: Transmit the energy consumption information by using a data exchange process.

When data is exchanged between mesh nodes, energy consumption information of the mesh nodes is transmitted, and the energy consumption information includes whether power is supplied by a battery and a time that can be maintained by remaining power. For example, when data is exchanged between an AP and a client, energy consumption information of the AP is transmitted at the same time.

Optionally, when data is exchanged between mesh nodes, energy consumption information of the mesh nodes and energy consumption information of another mesh node that is randomly selected are transmitted. For example, when data is exchanged between an AP and a client, the AP not only transmits energy consumption information of the AP, but may also randomly select energy consumption information of a specific quantity of other mesh nodes, and transmit the energy consumption information of the specific quantity of other mesh nodes to the client. Certainly, the client may also randomly select energy consumption information of a specific quantity of other mesh nodes, and transmit the energy consumption information of the specific quantity of other mesh nodes to the AP.

Type 2: An ordinary node actively initiates transmission of the energy consumption information.

Specifically, each mesh node with a data exchange process may actively transmit obtained energy consumption information of another mesh node at a specific time frequency, such as once a day, so as to accelerate transmission of the energy consumption information.

Optionally, when transmitting the energy consumption information of another mesh node, the mesh node may randomly select and transmit energy consumption information of some nodes, or may transmit obtained energy consumption information of all other mesh nodes.

Type 3: A seed node initiates transmission of the energy consumption information.

Specifically, in this embodiment of the present disclosure, a mesh node that is in the mesh network and that is associated with other mesh nodes may be selected to transmit the energy consumption information in a broadcasting manner, so as to accelerate transmission of the energy consumption information. For example, an MPP may be selected, or a mesh node connected to most other mesh nodes may be selected to transmit the energy consumption information. In this embodiment of the present disclosure, the mesh node connected to the most other mesh nodes is preferentially selected as the seed node. For ease of description in this embodiment of the present disclosure, a mesh node that is associated with at least two mesh nodes is referred to as the seed node. Any mesh node that receives energy consumption information transmitted by the seed node in a broadcasting manner may forward the received energy consumption information, so that each mesh node in the mesh network may obtain energy consumption information of another mesh node.

Optionally, in this embodiment of the present disclosure, a specified quantity of seed nodes in the mesh network may be selected according to an actual need to transmit the energy consumption information, and all mesh nodes with a seed node function do not need to be used as seed nodes.

Further, in this embodiment of the present disclosure, a selected seed node may transmit the energy consumption information at a specific time frequency, such as once a day.

In a specific implementation process, a specific method for transmitting the energy consumption information is not limited in this embodiment of the present disclosure, and the foregoing methods are merely examples for description.

It may be understood that, in this embodiment of the present disclosure, if the energy consumption information of the second mesh node is transmitted by using the seed node, and the third mesh node involved in this embodiment of the present disclosure may be the seed node, the first mesh node may obtain the energy consumption information of the second mesh node by using the seed node.

Second, a process of selecting a route by a mesh node based on energy consumption information is described.

The first mesh node may determine a power supply manner for each of the second mesh nodes that can provide a route. If power supply manners for the at least two second mesh nodes are different, a route is selected in a sequence that a priority of non-battery power supply is higher than a priority of battery power supply, so as to prolong an available time of the mesh network.

Further, the first mesh node that selects a route may obtain signal strength and the energy consumption information of each of the second mesh nodes that can provide a route for the first mesh node. Therefore, if the power supply manners for the at least two second mesh nodes are the same, a route may be selected according to a time that can be maintained by remaining power and signal strength of the at least two second mesh nodes, so that energy consumption of the mesh nodes in the mesh network is more balanced.

Specifically, in this embodiment of the present disclosure, to balance the energy consumption of the mesh nodes in the mesh network, a current manner of selecting a mesh node merely according to signal strength of mesh nodes and load states of mesh nodes may be changed, and a mesh node may be selected by comprehensively considering signal strength of mesh nodes, load states of mesh nodes, and a time that can be maintained by remaining power of mesh nodes. For example, in this embodiment of the present disclosure, different weight ratios may be set for the energy consumption information according to the signal strength of the mesh node and the time that can be maintained by the remaining power of the mesh node, and a mathematical operation is performed, to obtain a value that can reflect impact on the energy consumption information by the signal strength of the mesh node and the time that can be maintained by the remaining power of the mesh node, and select a mesh node according to the value. For ease of description in this embodiment of the present disclosure, a comprehensive and preferred index is used to represent the value obtained after the mathematical operation is performed, according to the different weight ratios, on the time that can be maintained by the remaining power and the signal strength.

In this embodiment of the present disclosure, the comprehensive and preferred index may be determined in multiple manners. For example, the comprehensive and preferred index may be determined in the following manners.

A first manner: comprehensive and preferred index=Time that can be maintained by remaining power×w1+Signal strength×w2, where w1+w2=1.

A second manner: comprehensive and preferred index=w1×(Time that can be maintained by remaining power)$^n$+w2×(Signal strength)$^m$, where w1+w2=1, and m and n are positive integers.

A third manner: comprehensive and preferred index= (Time that can be maintained by remaining power)$^n$+(Signal strength)$^m$, where m and n are positive integers.

In this embodiment of the present disclosure, the comprehensive and preferred index is determined in different manners in different signal strength ranges.

Specifically, the first mesh node may select a route according to the time that can be maintained by remaining power and the signal strength of the at least two second mesh nodes in the following manner, including determining, by the first mesh node, a signal strength range of signal strength of each of the second mesh nodes; selecting, according to the determined signal strength range, a preset manner for determining a comprehensive and preferred index, and determining a comprehensive and preferred index of each of the second mesh nodes according to the determined manner for determining a comprehensive and preferred index; and sorting the obtained comprehensive and preferred indexes of the second mesh nodes, and selecting a route in descending order of the comprehensive and preferred indexes.

For example, the manner for determining a comprehensive and preferred index is set as follows.

A: When the signal strength range is in (0.9, 1], the comprehensive and preferred index is determined according to comprehensive and preferred index=Time that can be maintained by remaining power×0.5+Signal strength×0.5.

Optionally, when the signal strength is in a range of (0.9, 1], a signal has already been extremely strong, and there is no essential difference between a signal strength of 0.92 and a signal strength of 0.95. Therefore, "signal strength" may be collectively considered as 1, and Comprehensive and preferred index=1×0.5+Time that can be maintained by remaining power×0.5.

B: When the signal strength is in a range of (0.8, 0.9], the comprehensive and preferred index is determined according to comprehensive and preferred index=Time that can be maintained by remaining power×0.5+Signal strength×0.5.

C: When the signal strength is in a range of (0.1, 0.8], the comprehensive and preferred index is determined according to comprehensive and preferred index=Signal strength×0.7+ Time that can be maintained by remaining power×0.3.

It is assumed that a mesh node A needs to select one mesh node from a mesh node B, a mesh node C, or a mesh node D as a route, and in this case, signal strength of the mesh node B is 0.95, and a time that can be maintained by remaining power is 0.5; signal strength of the mesh node C is 0.85, and a time that can be maintained by remaining power is 0.9; and signal strength of the mesh node D is 0.5, and a time that can be maintained by remaining power is 0.5.

For A, comprehensive and preferred indexes of the mesh node B, the mesh node C, and the mesh node D are comprehensive and preferred index_B=1×0.5+0.5× 0.5=0.75; comprehensive and preferred index_C=0.85×0.5+ 0.9×0.5=0.875; and comprehensive and preferred index_D=0.5×0.7+0.5×0.3=0.5.

Therefore, when selecting a route, the mesh node A may preferentially select the mesh node C as a route node.

It should be noted that, in this embodiment of the present disclosure, the foregoing process of determining the comprehensive and preferred index is merely exemplary description. A specific calculation formula, a threshold, and a weight may be adjusted according to actual application.

It should be further noted that, in this embodiment of the present disclosure, in the foregoing route selection process, signal strength and energy consumption information are comprehensively considered, but load of the mesh node is not considered. However, in actual application, a route may be selected by comprehensively considering information such as signal strength, energy consumption information, and a load state.

Further, in this embodiment of the present disclosure, when a mesh node is in power shortage, the mesh node may actively disable a data forwarding function. In this way, a service capability provided by the mesh node may last for a longer time, and an overall service-available time of the mesh network is prolonged. A detailed description is as follows.

Figure 3:
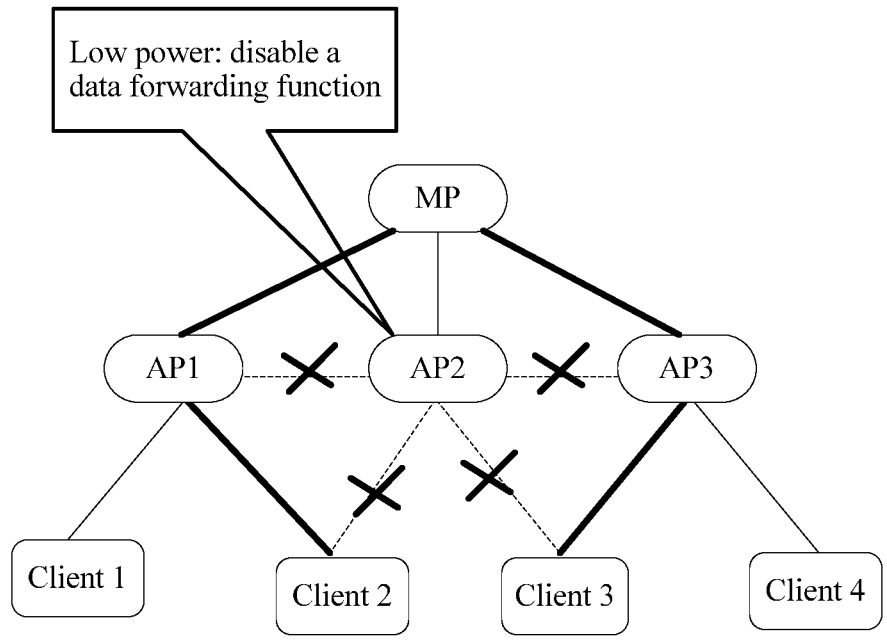
FIG. 3 is a schematic diagram of processing of data forwarding function disabling according to an embodiment of the present disclosure.

The mesh node may disable the data forwarding function according to a length of a time that can be maintained by remaining power of the mesh node, and send a data forwarding function disabling notification message to another mesh node, so that a mesh node that is associated with the mesh node tries to associate another mesh node. For example, in a mesh network shown in FIG. 3, if a time that can be maintained by remaining power of an AP 2 is insufficient, the AP 2 sends a data forwarding function disabling notification message to an AP 1, an AP 3, a client 2, and a client 3 that are associated with the AP 2, so that the AP 1, the AP 3, the client 2, and the client 3 try to associate other mesh nodes. For example, the client 2 is associated with the AP 1, the client 3 is associated with the AP 3, and the AP 1 and the AP 3 are associated with an MP.

Optionally, the mesh node may send the data forwarding function disabling notification message to another mesh node when remaining power is lower than a preset threshold. The mesh node that sends the data forwarding function disabling notification message may further send the time that can be maintained by the remaining power to the another mesh node based on a current busy degree.

Optionally, a mesh node that receives the data forwarding function disabling notification message may feed back, to the mesh node that sends the data forwarding function disabling notification message, whether to agree with disabling of the data forwarding function. For example, if a more appropriate mesh node is found, the mesh node that sends the data forwarding function disabling notification message is notified of agreement with disabling of the data forwarding function. If a more appropriate mesh node is not found, the mesh node that sends the data forwarding function disabling notification message is notified of disagreement with disabling of the data forwarding function, and the mesh node that sends the data forwarding function disabling notification message determines whether to disable the data forwarding function.

According to the foregoing implementation manner of disabling the data forwarding function, in this embodiment of the present disclosure, the second mesh node that can provide a route may disable a data forwarding function according to a length of a time that can be maintained by remaining power, and send a data forwarding function disabling notification message to the first mesh node that selects the second mesh node as the route node, so that the first mesh node tries to select another second mesh node, and an available time of the mesh network is prolonged.

Still further, in this embodiment of the present disclosure, when the remaining power of the mesh node that sends the data forwarding function disabling notification message recovers, for example, a battery is replaced manually, or the remaining power is higher than a preset threshold, the mesh node may re-enable the data forwarding function, and send a data forwarding function enabling notification message. The mesh node that sends the data forwarding function enabling notification message may further send the time that can be maintained by the remaining power to another mesh node based on a current busy degree.

Figure 4:
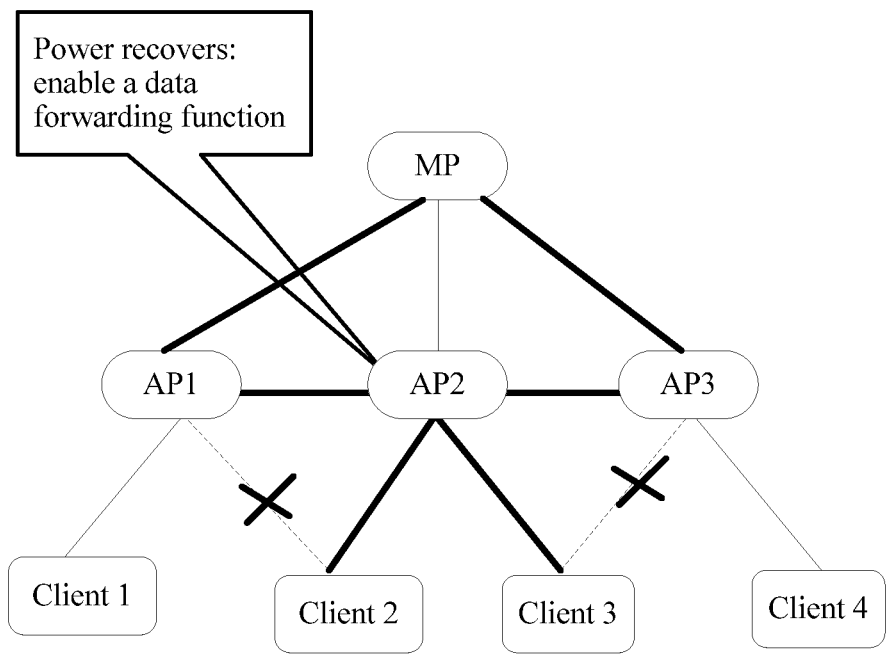
FIG. 4 is a schematic diagram of processing of data forwarding function enabling according to an embodiment of the present disclosure.

Optionally, a mesh node that receives the data forwarding function enabling notification message may reselect a route after comparing energy consumption information of a currently selected mesh node and energy consumption information of the mesh node that sends the data forwarding function enabling notification message, so as to select a more appropriate mesh node. As shown in FIG. 4, power of an AP 2 recovers, and the AP 2 sends a data forwarding function enabling notification message to an AP 1, an AP 1, an AP 3, a client 2, and a client 3. The AP 1, the AP 3, the client 2, and the client 3 reselect routes. The client 2 and the client 3 reselect the AP 2 as route nodes, and the AP 1 and the AP 3 reselect an MP and the AP 2 as route nodes.

Optionally, in this embodiment of the present disclosure, in a process of transmitting energy consumption information by each mesh node, an active parameter of the mesh node may also be transmitted, and the active parameter is used to represent a time difference between a time at which the mesh node recently sends a message and a current time. If the active parameter exceeds a specific threshold, it indicates that the mesh node has lost contact, and a reason of losing contact is that the mesh node runs out of power or a battery runs out of power due to a fault. Therefore, the mesh node may determine, by obtaining an active parameter of another mesh node, the mesh node that has lost contact, so as to report information about the mesh node that has lost contact.

Figure 5A:
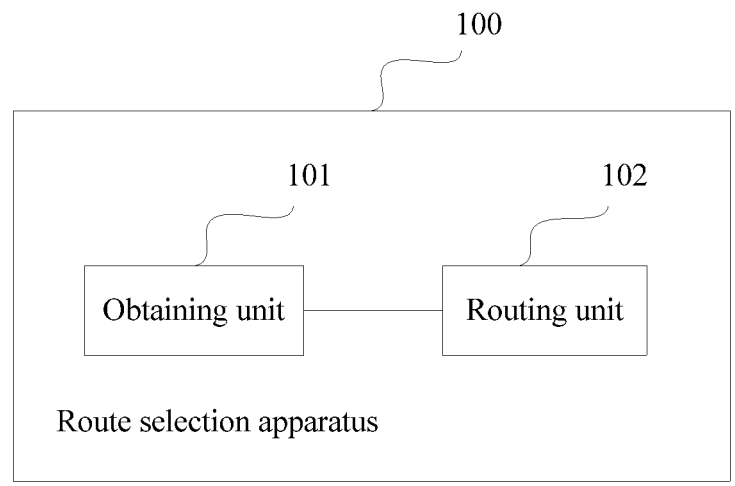
FIG. 5A to FIG. 5B are schematic diagrams of composition of a route selection apparatus according to an embodiment of the present disclosure.

Based on the route selection method provided in the foregoing embodiment, an embodiment of the present disclosure further provides a route selection apparatus 100. FIG. 5A is a schematic diagram of composition of the route selection apparatus 100 according to this embodiment of the present disclosure. As shown in FIG. 5A, the route selection apparatus 100 includes an obtaining unit 101 and a routing unit 102. The obtaining unit 101 is configured to obtain energy consumption information of at least two mesh nodes, and the routing unit 102 is configured to select a route according to the energy consumption information of the at least two mesh nodes that is obtained by the obtaining unit 101.

Specifically, the obtaining unit 101 obtains the energy consumption information of the at least two mesh nodes in at least one of the following manners, including obtaining the energy consumption information of the mesh node by using the mesh node; or obtaining the energy consumption information of the mesh node by using another mesh node that can obtain the energy consumption information of the mesh node.

Optionally, another mesh node is a mesh node that is in the mesh network and that is associated with at least two mesh nodes.

Optionally, the obtaining unit 101 is further configured to obtain other energy consumption information that is transmitted by the mesh node and that is different from the energy consumption information of the mesh node.

Figure 5B:
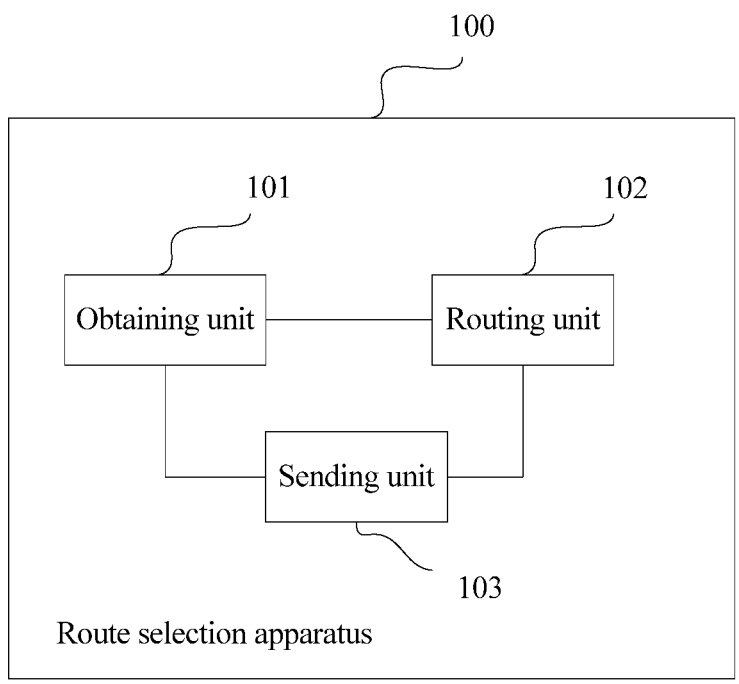

In this embodiment of the present disclosure, the route selection apparatus 100 further includes a sending unit 103. As shown in FIG. 5B, the sending unit 103 is configured to forward the energy consumption information that is of the mesh node and that is obtained by the obtaining unit 101 and the other energy consumption information that is different from the energy consumption information of the mesh node, so that energy consumption information of each mesh node is transmitted in a larger scale, and each mesh node in the mesh network can obtain energy consumption information of another mesh node.

In this embodiment of the present disclosure, the energy consumption information includes a power supply manner for the mesh node and a time that can be maintained by remaining power of the mesh node. The routing unit 102 is specifically configured to select a route according to the energy consumption information of the at least two mesh nodes in the following manner, including determining a power supply manner for each of the mesh nodes; and if the power supply manners for the at least two mesh nodes are different, selecting a route in a sequence that a priority of non-battery power supply is higher than a priority of battery power supply; or if the power supply manners for the at least two mesh nodes are the same, selecting a route according to a time that can be maintained by remaining power and signal strength of the at least two mesh nodes.

Specifically, the routing unit 102 is specifically configured to select a route according to the time that can be maintained by remaining power and the signal strength of the at least two mesh nodes in the following manner, including determining a signal strength range of signal strength of each of the mesh nodes; selecting, according to the determined signal strength range, a preset manner for determining a comprehensive and preferred index, and determining a comprehensive and preferred index of each of the mesh nodes according to the determined manner for determining a comprehensive and preferred index, where the comprehensive and preferred index is a value obtained after a mathematical operation is performed, according to different weight ratios, on the time that can be maintained by the remaining power and the signal strength, and the comprehensive and preferred index is determined in different manners in different signal strength ranges; and sorting the comprehensive and preferred indexes, and selecting a route in descending order of the comprehensive and preferred indexes.

Optionally, the obtaining unit 101 is further configured to receive a data forwarding function disabling notification message sent by a selected mesh node, so that the selected mesh node can maintain data exchange for a longer time, to prolong an available time of the mesh network. The obtaining unit 101 may further obtain a data forwarding function enabling notification message sent by an unselected mesh node, so that the mesh node that needs to select a route can select a more appropriate mesh node.

According to the present disclosure, energy consumption information of a mesh node that can provide a route may be comprehensively considered when a route is selected, and the mesh node can maintain data exchange for as a longer time as possible, so that an available time of a mesh network can be prolonged.

It should be noted that the route selection apparatus 100 provided in this embodiment of the present disclosure may be configured to implement the route selection method involved in the foregoing embodiment. Therefore, for parts of the route selection apparatus 100 that are not described in enough detail, reference may be made to descriptions of the related method embodiment, and details are not described herein again.

Figure 6:
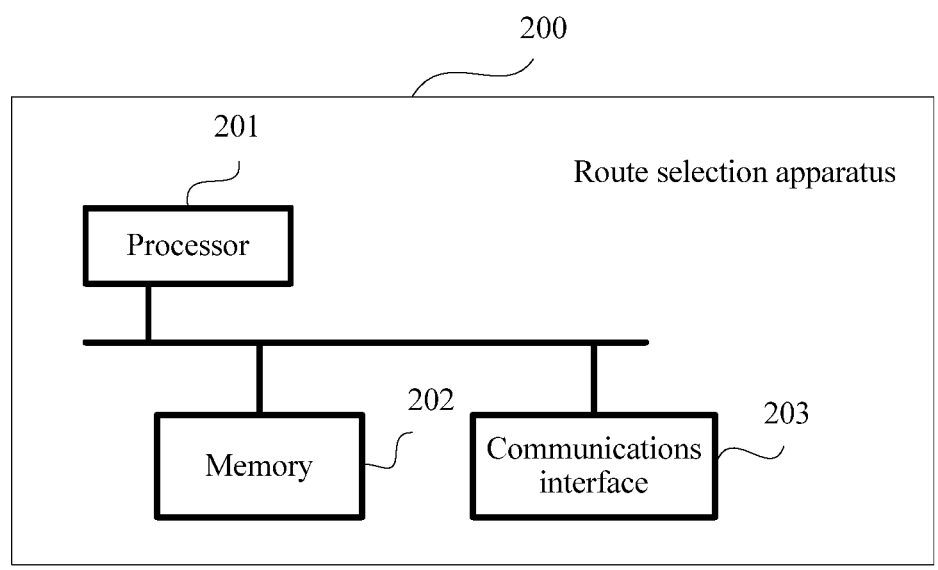
FIG. 6 is another schematic diagram of composition of a route selection apparatus according to an embodiment of the present disclosure.

An embodiment of the present disclosure further provides a route selection apparatus that is used by each mesh node in a mesh network to select a route. FIG. 6 is a schematic diagram of composition of a route selection apparatus 200 according to another embodiment of the present disclosure. A general-purpose computer system structure including a bus, a processor 201, a memory 202, and a communications interface 203 is used for the route selection apparatus 200. Program code that is used to execute the solution in the present disclosure is stored in the memory 202, and execution is controlled by the processor 201.

The bus may include a channel for conveying information between parts of a computer.

The processor 201 may be a general-purpose central processing unit (CPU), a microprocessor, an application-specific integrated circuit (ASIC), or one or more integrated circuits used to control program execution of the solution in the present disclosure. One or more memories included in the computer system may be a read-only memory (ROM) or a static storage device of another type that is capable of storing static information and a static instruction, a random access memory (RAM) or a dynamic storage device of another type that is capable of storing information and an instruction, and may also be a magnetic disk memory. The memories are connected to the processor by the bus.

The communications interface 203 may be an apparatus of a transceiver type, so as to communicate with another device or communications network, such as an Ethernet, a radio access network (RAN), or a wireless local area network (WLAN).

The memory 202, such as RAM, stores an operating system and a program that is used to execute the solution in the present disclosure. The operating system is a program that is used to control running of another program and manage a system resource.

The program stored in the memory 202 is used to instruct the processor 201 to perform a route selection method that includes obtaining energy consumption information of at least two mesh nodes, and selecting a route according to the energy consumption information of the at least two mesh nodes.

It may be understood that the route selection apparatus 200 in this embodiment may be configured to implement all functions involved in the foregoing method embodiment. For a specific implementation process, reference may be made to related descriptions of the foregoing method embodiment, and details are not described herein again.

An embodiment of the present disclosure further provides a computer storage medium that is configured to store a computer software instruction used by the route selection apparatus in FIG. 5A, FIG. 5B, or FIG. 6, and the computer software instruction includes the involved program that is used to perform the foregoing method embodiment.

Although the present disclosure is described with reference to the embodiments, in a process of implementing the present disclosure that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read only memory (CD-ROM), an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing.

Therefore, the instructions executed on the computer or another programmable device provide steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and accompanying drawings are merely exemplary description of the present disclosure defined by the accompanying claims, and is considered as any of or all modifications, variations, combinations or equivalents that cover the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A route selection method implemented by a first mesh node, comprising:
   obtaining first energy consumption information of the first mesh node;
   obtaining second energy consumption information of a second mesh node;
   receiving a route of the second mesh node;
   selecting the route according to the first energy consumption information and the second energy consumption information;
   disable a data forwarding function according to the first energy consumption information when the first mesh node is in a power shortage; and
   send a data forwarding function disabling notification message to the second mesh node according to the first energy consumption information when the first mesh node is in the power shortage.

2. The route selection method of claim 1, wherein obtaining the second energy consumption information comprises obtaining the second energy consumption information from the second mesh node.

3. The method of claim 1, wherein the second energy consumption information comprises obtaining the second energy consumption information using a third mesh node, and wherein the third mesh node is in a mesh network with the first mesh node and the second mesh node.

4. The route selection method of claim 2, further comprising:
   obtaining third energy consumption information of a fourth mesh node from the second mesh node; and
   forwarding the second energy consumption information and the third energy consumption information to another mesh node that is different from the first mesh node.

5. The route selection method of claim 2, wherein the second energy consumption information comprises a power supply manner for the second mesh node and a time that can be maintained by a remaining power of the second mesh node, wherein the second mesh node comprises at least two second mesh nodes, and wherein selecting the route according to the second energy consumption information comprises:
   determining a power supply manner for the at least two second mesh nodes; and
   selecting the route according to the time that can be maintained by the remaining power and a signal strength of the at least two second mesh nodes when the power supply manner of the at least two second mesh nodes is the same.

6. The route selection method of claim 5, wherein selecting the route according to the time that can be maintained by the remaining power and the signal strength of the at least two second mesh nodes comprises:
   determining a signal strength range of the signal strength of the at least two second mesh nodes;
   selecting, according to the signal strength range, a preset manner for determining a comprehensive and preferred index;
   determining a value for a corresponding comprehensive and preferred index of the at least two second mesh nodes according to the preset manner, wherein determining the value for the corresponding comprehensive and preferred index is based on each of a mathematical operation and different weight ratios according to the time that can be maintained by the remaining power and the signal strength, and wherein the corresponding comprehensive and preferred index is determined in different manners in different signal strength ranges;
   sorting the corresponding comprehensive and preferred indexes; and
   selecting the route in descending order of the corresponding comprehensive and preferred indexes.

7. The route selection method of claim 2, wherein the second energy consumption information comprises a power supply manner for the second mesh node and a time that can be maintained by a remaining power of the second mesh node, and wherein selecting the route according to the second energy consumption information comprises:
   determining a power supply manner for each of at least two second mesh nodes; and
   selecting the route in a sequence that a first priority of non-battery power supply is higher than a second priority of battery power supply when the power supply manner is different.

8. A route selection apparatus in a first mesh node, comprising:
   a memory comprising instructions; and
   a processor coupled to the memory and configured to execute the instructions, wherein the instructions cause the processor to be configured to:
   obtain first energy consumption information of the first mesh node;
   obtain second energy consumption information of a second mesh node;
   receive a route of the second mesh node;
   select the route according to the second energy consumption information;
   disable a data forwarding function according to the first energy consumption information when the first mesh node is in a power shortage ; and
   send a data forwarding function disabling notification message to the second mesh node according to the first energy consumption information when the first mesh node is in the power shortage.

9. The route selection apparatus of claim 8, wherein the instructions further cause the processor to be configured to obtain the first energy consumption information from the second mesh node.

10. The route selection apparatus of claim 8, wherein the instructions further cause the processor to be configured to obtain the second energy consumption information using a third mesh node, and wherein the third mesh node is in a mesh network with the first mesh node and the second mesh node.

11. The route selection apparatus of claim 9, wherein the instructions further cause the processor to be configured to:
obtain third energy consumption information of a fourth mesh node from the second mesh node, wherein the fourth mesh node is different from the second mesh node; and
forward the second energy consumption information and the third energy consumption information to another mesh node that is different from the first mesh node.

12. The route selection apparatus of claim 9, wherein the second energy consumption information comprises a power supply manner for the second mesh node and a time that can be maintained by a remaining power of the second mesh node, wherein the second mesh node comprises at least two second mesh nodes, and wherein the instructions further cause the processor to be configured to:
determine a power supply manner for the at least two second mesh nodes; and
select the route according to the time that can be maintained by the remaining power and a signal strength of the at least two second mesh nodes when the power supply manner for the at least two second mesh nodes is the same.

13. The route selection apparatus of claim 12, wherein the instructions further cause the processor to be configured to:
determine a signal strength range of the signal strength of the at least two second mesh nodes;
select, according to the signal strength range, a preset manner for determining a comprehensive and preferred index;
determine a value for a corresponding comprehensive and preferred index of the at least two second mesh nodes according to the preset manner for determining the comprehensive and preferred index, wherein the comprehensive and preferred index is based on each of a mathematical operation and different weight ratios according to the time that can be maintained by the remaining power and the signal strength, and wherein the corresponding comprehensive and preferred index is determined in different manners in different signal strength ranges;
sort the corresponding comprehensive and preferred indexes; and
select the route in descending order of the corresponding comprehensive and preferred indexes.

14. The route selection apparatus of claim 9, wherein the second energy consumption information node comprises a power supply manner for the second mesh node and a time that can be maintained by a remaining power of the second mesh node, and wherein the instructions further cause the processor to be configured to:
determine a power supply manner for the second mesh node; and
select the route in a sequence that a first priority of non-battery power supply is higher than a second priority of battery power supply when the power supply manner is different.

15. A computer program product comprising instructions stored on a non-transitory computer-readable medium that when executed on a processor causes an apparatus of a first mesh node to be configured to:
obtain first energy consumption information of the first mesh node and second energy consumption information of a second mesh node;
receive a route from the second mesh node;
select a route according to the second energy consumption information;
disable a data forwarding function according to the first energy consumption information when the first mesh node is in a power shortage; and
send a data forwarding function disabling notification message to the second mesh node according to the first energy consumption information when the first mesh node is in the power shortage.

16. The computer program product of claim 15, wherein the instructions further cause the apparatus to be configured to obtain the second energy consumption information from the second mesh node.

17. The computer program product of claim 15, wherein the instructions further cause the apparatus to be configured to obtain the second energy consumption information using a third mesh node, and wherein the third mesh node is in a mesh network with the first mesh node and the second mesh node.

18. The computer program product of claim 16, wherein the instructions further cause the apparatus to be configured to:
obtain third energy consumption information of a fourth mesh node from the second mesh node, wherein the fourth mesh node is different from the second mesh node; and
forward the second energy consumption information and the third energy consumption information to another mesh node, wherein the other mesh node is different from the first mesh node.

19. The computer program product of claim 16, wherein the second energy consumption information comprises a power supply manner for the second mesh node and a time that can be maintained by a remaining power of the second mesh node, wherein the second mesh node comprises at least two second mesh nodes, and wherein the instructions further cause the apparatus to be configured to:
determine a power supply manner for the at least two second mesh nodes; and
either (a) select a route in a sequence that a priority of non-battery power supply is higher than a priority of battery power supply when the power supply manners for the at least two second mesh nodes are different; or
(b) select the route according to the time that can be maintained by the remaining power and a signal strength of the at least two second mesh nodes when the power supply manner for the at least two second mesh nodes is the same.

20. The computer program product of claim 19, wherein the instructions further cause the apparatus to:
determine a signal strength range of a signal strength of the at least two second mesh nodes;
select, according to the determined signal strength range, a preset manner for determining a comprehensive and preferred index;
determine a value for a comprehensive and preferred index of the at least two second mesh nodes according to the preset manner for determining the comprehensive and preferred index, wherein the comprehensive and preferred index is based on each of a mathematical operation and different weight ratios according to the time that can be maintained by the remaining power and the signal strength, and wherein a corresponding comprehensive and preferred index is determined in different manners in different signal strength ranges;

sort the corresponding comprehensive and preferred indexes; and select the route in descending order of the comprehensive and preferred indexes.

\* \* \* \* \*